US009068138B2

(12) United States Patent
Jourdain et al.

(10) Patent No.: US 9,068,138 B2
(45) Date of Patent: Jun. 30, 2015

(54) SYNERGISTIC ANTIOXIDANT COMPOSITION

(75) Inventors: Laureline Jourdain, Lausanne (CH); Laurent Sagalowicz, Blonay (CH)

(73) Assignee: Nestec S.A., Vevey (CH)

( * ) Notice: Subject to any disclaimer, the term of this patent is extended or adjusted under 35 U.S.C. 154(b) by 96 days.

(21) Appl. No.: 13/700,035

(22) PCT Filed: May 20, 2011

(86) PCT No.: PCT/EP2011/058240
§ 371 (c)(1),
(2), (4) Date: Nov. 26, 2012

(87) PCT Pub. No.: WO2011/147747
PCT Pub. Date: Dec. 1, 2011

(65) Prior Publication Data
US 2013/0078352 A1 Mar. 28, 2013

(30) Foreign Application Priority Data
May 25, 2010 (EP) .................................... 10163753

(51) Int. Cl.
| | |
|---|---|
| *C11B 5/00* | (2006.01) |
| *A23D 7/06* | (2006.01) |
| *A23D 9/06* | (2006.01) |
| *A23K 1/16* | (2006.01) |
| *A23L 1/30* | (2006.01) |
| *A23L 1/302* | (2006.01) |
| *A23L 1/308* | (2006.01) |
| *A23L 3/3463* | (2006.01) |
| *A23L 3/3472* | (2006.01) |
| *A23L 3/3481* | (2006.01) |
| *A23L 3/3562* | (2006.01) |

(52) U.S. Cl.
CPC ............... *C11B 5/0007* (2013.01); *A23D 7/06* (2013.01); *A23D 9/06* (2013.01); *A23K 1/164* (2013.01); *A23L 1/3006* (2013.01); *A23L 1/3008* (2013.01); *A23L 1/302* (2013.01); *A23L 1/308* (2013.01); *A23L 3/3463* (2013.01); *A23L 3/3472* (2013.01); *A23L 3/3481* (2013.01); *A23L 3/3562* (2013.01); *A23V 2002/00* (2013.01); *C11B 5/0028* (2013.01); *C11B 5/0035* (2013.01); *C11B 5/0092* (2013.01)

(58) Field of Classification Search
USPC .......................................................... 426/545
See application file for complete search history.

(56) References Cited

U.S. PATENT DOCUMENTS

| | | | |
|---|---|---|---|
| 5,364,886 A | 11/1994 | Loeliger | |
| 5,688,528 A | 11/1997 | Carlsson et al. | |
| 5,716,639 A | 2/1998 | Carlson et al. | |
| 6,024,997 A * | 2/2000 | Blaschke et al. | ............... 426/144 |
| 2003/0215473 A1 | 11/2003 | Carlsson et al. | |
| 2005/0049205 A1 | 3/2005 | Larsen et al. | |
| 2005/0063930 A1* | 3/2005 | Carlsson et al. | ............. 424/70.1 |

FOREIGN PATENT DOCUMENTS

| | | |
|---|---|---|
| EP | 1340430 | 9/2003 |
| WO | 9740838 | 11/1997 |
| WO | 2008108001 | 9/2008 |
| WO | WO 2009/090249 | * 7/2009 |

OTHER PUBLICATIONS

Mosca et al. "Biocompatible Water-in-Oil Emulsion as a Model to Study Ascorbic Acid Effect on Lipid Oxidation" in J. Phys. Chem, 2008, 112, p. 4635-4641.*
Carelli et al. "Effectiveness of added natural antioxidants in sunflower oil" in Grasas y Aceites, vol. 56, Fas. 4, 2005, p. 303-310.*
Carbone et al.—WO 2008108001—Derwent Abstract.*
Kilicgun et al. "In vitro Antioxidant Effect of *Rosa canina* in Different Antioxidant Test Systems" Pharmacology Research, vol. 1, issue 6, Nov.-Dec. 2009, pp. 417-420.
Meredith "Rose Hip Freezer Jam Recipe" About.com Food Preservation, 1 page.
Smith "Hip, hip, hooray for humble rosehip" Otago Daily Times, Mar. 18, 2014, 2 pages.
Larsen et al. "An Antiinflammatory Galactolipid from Rose Hip (*Rosa canina*) that Inhibits Chemotaxis of Human Peripheral Blood Neutrophils in Vitro" J. Nat. Prod. 2003, 66, pp. 994-995.
PCT International Search Report for Application No. PCT/EP2011/058240 with a Mailing Date of Sep. 8, 2013; 3 pages.
Written Opinion of the PCT International Search Report for Application No. PCT/EP2011/058240 with a Mailing Date of Sep. 8, 2013; 4 pages.

* cited by examiner

*Primary Examiner* — Elizabeth Gwartney
(74) *Attorney, Agent, or Firm* — K&L Gates LLP

(57) ABSTRACT

The present invention relates to an antioxidant composition comprising a galactolipid, ascorbic acid and/or a derivative thereof, and at least one further lipid. Further aspects of the invention are the method of manufacturing such an antioxidant composition as well as the use of galactolipids in combination with ascorbic acid and/or a derivative thereof for protecting a composition against oxidation. Particularly, the invention relates to a composition to be used in food products.

16 Claims, No Drawings

SYNERGISTIC ANTIOXIDANT COMPOSITION

CROSS REFERENCE TO RELATED APPLICATIONS

The present application is a National Stage of International Application No. PCT/EP2011/058240, filed on May 20, 2011, which claims priority to European Patent Application No. 10163753.6, filed on May 25, 2010, the entire contents of which are being incorporated herein by reference.

The present invention generally relates to the field of antioxidant compositions. In particular the present invention relates to an antioxidant composition to be used in food products. One embodiment of the present invention relates to a composition comprising a galactolipid, ascorbic acid and/or a derivative thereof, and at least one further lipid. Further aspects of the invention are the method of manufacturing such an antioxidant composition as well as the use of galactolipids in combination with ascorbic acid and/or a derivative thereof for protecting a composition against oxidation.

Many oil products, such as unsaturated triglycerides, are prone to chemical oxidation. This leads to the formation of primary and secondary oxidation products which can lead to rancidity affecting the odour and taste of products containing such unsaturated lipids. For example, certain unsaturated triglycerides, when oxidized, result in a pronounced undesired fishy smell and taste. In addition, such primary or secondary oxidation products can have a negative impact on the health of a consumer.

The use of antioxidants to protect oil against oxidation has been known for some time. For example, US 2007/231438 discloses the use of an antioxidant composition comprising ascorbic acid dissolved in an alcoholic liquid carrier substance such as propylene glycol or ethanol.

The current trend with consumers in the field of antioxidants particularly when used in food products is to give preference to natural compounds having an antioxidant activity and avoiding the use and presence of alcohols in a final product.

U.S. Pat. No. 5,364,886 reports on a process for the preparation of a synergistic antioxidant mixture comprising tocopherol, ascorbic acid and a phospholipid deriving mainly from soya or egg yolk lecithin for protecting an oil against oxidation. Unfortunately, the antioxidant protective effect of this solution does not always prevent particularly the formation of secondary oxidation products. This may negatively impact the sensory attributes of such an oil through the formation of certain off-notes and off-flavours.

Hence, there is a persisting need in the industry to find alternative and/or better solutions to stabilise sensitive oils which comprise for example unsaturated triglycerides with antioxidants which are of a natural source, do not contain solvents or carriers which may be perceived by consumers as non-natural, and which still have an effective antioxidant, protective activity to such an oil or fat composition.

The object of the present invention was to improve the state of the art and to provide an improved and/or alternative composition which protects an oil or fat against oxidation, and a process of manufacturing such a composition.

The object of the present invention is achieved by the subject matter of the independent claims. The dependent claims further develop the idea of the present invention.

Accordingly, the present invention provides in a first aspect a composition comprising a galactolipid, ascorbic acid and/or a derivative thereof, and at least one further lipid.

It has been surprisingly found by the inventors, that when combining a galactolipid or an extract comprising a galactolipid with ascorbic acid or a derivative thereof, there is a synergism between the two ingredients resulting in a significantly improved anti-oxidant protective capacity which is much higher than that of the individual ingredients alone. For example, and as disclosed in more detail in Example 6, the presence of 0.5 wt % of a galactolipid in a sensitive fish oil improves the oxidative stability of this oil by a factor of 2.6, the presence of ascorbic acid alone in fish oil has no significant stabilizing effect, while the combination of both ingredients in the oil improves the oxidative stability by a factor of ca. 36.

Galactolipids are one of the main constituents of plant membrane lipids and are composed of sugar groups (galactose) attached to an aliphatic or lipophilic chain, to two aliphatic or lipophilic chains, to a chain containing a lipophilic chain, or to several chains for which at least one chain is a lipophilic or an aliphatic chain. They exist among others in the form of monogalactosyl diacylglycerol (MGDG) and digalacosyl diacylglycerol (DGDG), galactolipid spingolipis, galactolipid estolides such as digalacosyl diacylglycerol mono-estolide or monogalactosyl diacylglycerol mono-estolide. Because of their chemical structure, galactolipids are known to have antioxidant as well as several health beneficial properties (see for example: US2006/7084122 and WO05/027937).

Advantageously, the combination of a galactolipid with ascorbic acid and/or a derivate thereof can now be used to prolong the stability and quality of oxidation sensitive oils over a longer period of time. Hence, the shelf-life of a high quality oil can be significantly prolonged without the appearance of primary and secondary oxidation products, and/or the emergence of undesired off-tastes and/or off-flavours. Alternatively, the concentration and use of anti-oxidants can be reduced in products such as in high quality oils in comparison to the prior art solutions, as the synergistic effect of the disclosed mixture is significantly more effective. Hence, production costs and possible impacts on product flavours by the anti-oxidant can be reduced.

Furthermore, the invention is a natural effective anti-oxidant solution, which may not make use of or reside in any organic solvents in an end-product and hence provides a consumer friendly product at the end of the production process.

A further interesting aspect is also that galactolipids and galactolipid extracts have a rather pleasant and superior taste profile if used in an oil or fat product compared to phospholipids.

The composition of the invention may be an oil or a fat, whereby oil is defined as a hydrophobic liquid at ambient temperature basically constituted of lipids, while a fat is solid at ambient temperature and is basically also constituted of lipids. The said oil and fat may comprise at least 80 wt % of lipids, preferably at least 90 wt % lipids.

One embodiment of the present invention pertains to a composition comprising a galactolipid, and ascorbic acid and/or a derivative thereof, wherein the concentration of the galactolipid in said composition is at least 0.005 wt % or higher, preferably at least 0.05 wt % of the total composition.

The higher the concentration of galactolipids in the final product, the higher and more effective is the capacity of that galactolipid in combination with an ascorbic acid and/or its derivative for an anti-oxidant protection of that final composition.

Derivatives of ascorbic acid are defined as products directly originating from ascorbic acid as for example an ester of said acid and another compound. A derivative of ascorbic acid as of the invention is for example ascorbyl palmitate.

It was found that the synergistic effect does not reside only between galactolipids and ascorbic acid per se, but was effective also for derivatives of the ascorbic acid.

The composition of the invention may have a range of the weight ratio of galactolipid versus ascorbic acid or its derivative from 100:1 to 1:1. Preferably, the range of the weight ratio is from 50:1 to 1:1, 40:1 to 1:1, 20:1 to 1:1, or 10:1 to 1:1, and more preferably from 4:1 to 1:1.

Advantageously, the ratio between the two ingredients is adjusted to optimize the synergistic anti-oxidant effect of the mixture while keeping the concentration of each individual ingredient low. Weight ratios which were found to work effectively in particular are 9:1, 6:1 and 2:1. Further ratios found to work well are 40:1 and 17:1 as demonstrated in Examples 13 and 14.

The galactolipids may be from plant origin, the plant preferably being selected from cereals, vegetables, legumes or fruits, most preferably from the group consisting of wheat, corn, oat, barley, spinach, leek, parsley, perilla, pea, pumpkin, leek, sweet potato, and sweet potato leaves, or any combination thereof.

Plants have the advantage that they provide a good source of natural galactolipids from where they can be extracted in reasonable amounts which makes the invention applicable for a use in an industrial scale. Particularly, the plants such as wheat, corn, oat, barley, spinach, leek, parsley, perilla, pea, pumpkin, leek, sweet potato, and sweet potato leaves provide a good and rich source of galactolipids. Extracts from plant material are used advantageously as they have a good image with consumers and are considered as natural and healthy.

One embodiment of the present invention is a composition wherein at least one further lipid comprises an unsaturated fatty acid selected from the group consisting of oleic acid, myristoleic acid, palmitoleic acid, sapienic acid, erucic acid, alpha-linolenic acid (ALA), linoleic acid (LA), dihomo-gamma-linolenic acid (DGLA), conjugated linoleic acid (CLA), arachidonic acid (ARA), eicosapentaenoic acid (EPA), docosapentaenoic acid (DPA), docosahexaenoic acid (DHA), or any combinations thereof. These are all oxygen sensitive, high value unsaturated fatty acids. Their protection in a product adds to the superior quality of said product, particularly for the beneficial health effects of those fatty acids. With an improved oxidative stability of these unsaturated fatty acids, products containing them as for example fish oil or products containing fish oil have a longer shelf-life, i.e. they keep their healthy properties for a longer period of time before the natural degradation of those valuable fatty acids starts to take place, and they do not develop off-flavours.

In a further aspect, the invention relates to a method for manufacturing the composition of the invention, comprising mixing ascorbic acid and/or a derivative thereof and a galactolipid into an oil or a fat in order to protect said oil or fat against oxidation.

In a still further aspect, the invention relates to a method for manufacturing the composition of the invention, comprising the steps of i) mixing ascorbic acid and/or a derivative thereof with a galactolipid; and ii) adding the mixture to an oil or a fat in order to protect said oil or fat against oxidation. Besides the advantage of this method for being easier and more cost effective on an industrial scale application, the method provides a way to reduce the risk of damaging the sensitive unsaturated fatty acids of the oil to be protected. Thereby, the oil to be protected does not need to undergo any further extensive processing steps as for example heating in order to dissolve and homogeneously distribute an anti-oxidant. The ascorbic acid and/or its derivative is mixed and dissolved in the galactolipid preparation which is only thereafter mixed to the oil or fat to be protected against oxidation.

A preferred embodiment of the method is that mixing the ascorbic acid and/or the derivative thereof to a galactolipid is carried out in the presence of a solvent. Thereby, the ascorbic acid can for example first be dissolved in the solvent before mixing it to the galactolipid, while it may also be possible to admix the ascorbic acid together with the galactolipid in the solvent before adding it to an oil or a fat. Alternatively, all ingredients including the oil or the fat may be mixed directly together with a solvent. Using a solvent for mixing the ascorbic acid with galactolipid basically provides a faster and more homogenous mixing of the different ingredients with each other, and alternatively also a better mixing with the fat or the oil.

In a still further preferred embodiment, the solvent is evaporated again after the mixing step. This allows producing a homogenous composition while taking advantage of the solution capacity of a solvent, and still providing an end-product which does not contain any solvent anymore.

The solvent for the invention is preferably selected from the group consisting of water and ethanol, or a combination thereof. Both of these solvents provide excellent dissolution capabilities for the method in question and still are considered food-grade and safe solvents for such an application for use for example in a food product. Using water alone has the advantage that no alcohol is being used.

In a further embodiment of the invention, the galactolipid is used in the form of a plant extract.

The plant extract to be used in the method of the invention may comprise the galactolipid in a concentration of 5 wt % or more of the extract, preferably of 10 wt % or more of said extract. It is clear that the higher the concentration of galactolipid is that can be achieved in a plant extract, the more effective the plant extract can be used. It allows on one hand to either reduce the amount of plant extract to be used for a same effect, or on the other hand to substantially increase the effect of shelf-life stability of for example an oil or a fat by using a same amount of such plant extract.

A further aspect of the invention relates to the use of a galactolipid in combination with ascorbic acid and/or a derivative thereof for protecting a composition against oxidation.

In a further aspect, the invention pertains to a composition for use as and/or in a food product, comprising i) a galactolipid in a concentration from 0.005 wt % to 10 wt %, preferably from 0.05 wt % to 5 wt %, of said composition; ii) ascorbic acid and/or a derivative thereof, wherein the range of the weight ratio of the galactolipid versus the ascorbic acid or its derivative is from 50:1 to 1:1, preferably from 10:1 to 1:1; and iii) at least one further lipid, wherein the composition is an oil or a fat comprising at least 80 wt % lipids.

The inventors have found that too high concentrations of galactolipids in an oil composition which is intended for consumption as a food or as part of a food product is not preferred. In fact, it has been observed that too high concentrations of galactolipids in an oil for food consumption may have a negative impact on taste and flavor of such an oily food product. Furthermore, it is most often not advantageous to have concentrations of galactolipids above about 10 wt %, or even above about 5 wt %, in an oil, since any further increase in the concentration of such galactolipids do not necessarily further improve significantly the protective effect of the composition of the invention. Furthermore, food grade galactolipids are expensive and an excessive use of such lipids in an oil for food consumption would make this oil overly expensive for an economic industrial application.

A still further aspect of the invention is a human or animal food product comprising the composition of the invention. Thereby a human food product of the invention includes nutritional products for clinical health care, food supplements, infant feeding products as well as all other regular food and nutrition products for babies, children and adult persons. As example, a recipe for making a milk product as of the invention is provided in Example 10.

Those skilled in the art will understand that they can freely combine all features of the present invention disclosed herein. In particular, features described for the composition of the present invention may be combined with the methods and/or uses of the present invention and vice versa.

Further advantages and features of the present invention are apparent from the examples and tables.

EXAMPLES

Example 1

Method for Preparation of a Composition Comprising Galactolipids and Ascorbic Acid High purity digalactosyl diacylglycerol (DGDG) was supplied in 98:2 chloroform:methanol (Lipid Products UK, plant leaves extract from spinach leaves, ref. 1373, 95% purity, ~10% solution). Medium chain triglycerides (MCT Delios, Cognis, ref. 48842) was added to the galactolipid solution (475 mg of pure DGDG and 1530 mg of MCT) and the chloroform:methanol solvent was completely evaporated under vacuum at 50° C. for 60 min using a rotary evaporator in order to obtain a galactolipid-rich lipid composition. Ascorbic acid (Fluka, Vitamin C Ph Eur, ref. 95212, 99.8% purity) was dissolved in water (23.5 wt % in Millipore water) and 240 microliter of the ascorbic acid solution was added to the galactolipids-rich composition at 50° C. Water was slowly evaporated under vacuum (<10 mbar) at 50° C. for 30 min using a rotary evaporator. After evaporation of the solvent, the final composition contained 23.1 wt % of DGDG, 2.7 wt % ascorbic acid and 74.2 wt % MCT, corresponding to a galactolipid:ascorbic acid ratio of 9:1.

Example 2

Method for Preparation of a Composition Comprising Galactolipids and Ascorbyl Palmitate High purity digalactosyl diacylglycerol (DGDG) was supplied in 98:2 chloroform:methanol (Lipid Products UK, plant leaves extract from spinach leaves, ref. 1373, 95% purity, ~10% solution). Medium chain triglycerides (MCT Delios, Cognis, ref. 48842) was added to the galactolipid solution (475 mg of pure DGDG and 1530 mg of MCT) and the chloroform:methanol solvent was completely evaporated under vacuum at 50° C. for 60 min using a rotary evaporator in order to obtain a galactolipid-rich lipid composition. Ascorbyl palmitate (Sigma Aldrich, ascorbic acid 6-palmitate, ref. A1968, >95% purity) was dissolved in ethanol (23.5 wt % in absolute ethanol) and 240 microliter of the ascorbyl palmitate solution was added to the galactolipid-rich composition at 50° C. Ethanol was slowly evaporated under vacuum (<10 mbar) at 50° C. for 30 min using a rotary evaporator. After evaporation of the solvent, the final composition contained 23 wt % of DGDG, 2.7 wt % ascorbyl palmitate and 74.2 wt % MCT, corresponding to a galactolipid:ascorbyl palmitate ratio of 9:1.

Example 3

Method for Preparation of a Composition Comprising Galactolipid-Rich Extract and Ascorbic Acid A galactolipid-rich extract from plants was obtained in pure ethanol (oat extract, 10% total galactolipids, as determined by HPLC-ELSD). Ascorbic acid (Fluka, Vitamin C Ph Eur, ref. 95212, 99.8% purity) was added directly to the galactolipid-rich extract (5 g ascorbic acid, 95 g galactolipid-rich extract). The two ingredients were mixed at room temperature under reduced pressure for 30 min using a rotary evaporator (25° C., 400 mbar). The ethanol was then slowly evaporated under vacuum (<10 mbar) at 50° C. for 60 min using a rotary evaporator. After evaporation of the solvent, the final composition contained 10.5 wt % total galactolipids and 5 wt % ascorbic acid, corresponding to a galactolipid:ascorbic acid ratio of 2:1.

Example 4

Method for Preparation of a Composition Comprising Galactolipid-rich Extract and Ascorbyl Palmitate A galactolipid-rich extract from plants was obtained in pure ethanol (10% total galactolipids, as determined by HPLC-ELSD). Ascorbyl palmitate (Sigma Aldrich, ascorbic acid 6-palmitate, ref. A1968, >95% purity) was added to the galactolipid-rich extract (5 g ascorbyl palmitate, 95 g galactolipid-rich extract). The two ingredients were mixed at room temperature under reduced pressure for 30 min using a rotary evaporator (25° C., 400 mbar). The ethanol was then slowly evaporated under vacuum (<10 mbar) at 50° C. for 60 min using a rotary evaporator. After evaporation of the solvent, the final composition contained 10.5 wt % total galactolipids and 5 wt % ascorbyl palmitate, corresponding to a galactolipid:ascorbyl palmitate ratio of 2:1.

Example 5

Antioxidant Efficiency of Pure Galactolipids and Ascorbic Acid in Fish Oil

Three oil preparations were prepared as follows:
Galactolipids from spinach leaves (digalactosyl-diacylglycerol, 95% purity, DGDG only) were dispersed into non-stabilized fish oil (Sofinol, DHA-rich fish oil, desodorized, type MFO-KO) at room temperature to obtain a final concentration of 2.3 wt % of galactolipid in oil.
Ascorbic acid (Fluka, Vitamin C Ph Eur, ref. 95212, 99.8% purity) was dispersed into the non-stabilized fish oil at room temperature to obtain a final concentration of 0.27 wt % of ascorbic acid in oil.
A composition comprising galactolipids and ascorbic acid was prepared as described in example 1 (galactolipid:ascorbic acid ratio 9:1). 10 wt % of the latter composition was collected and dispersed to the non-stabilized fish oil at room temperature.

The Oxidative Stability Instrument (OSI, Omnion World) was used to evaluate the oxidative stability of the three oils containing DGDG or ascorbic acid or a combination of both DGDG and ascorbic acid. The stability was measured under accelerated conditions at 100° C. under oxygen flux. The stability was expressed as an induction time. A higher induction time corresponds to a higher stability of the oil. Example 5 shows that adding either 2.3% DGDG or 0.27% ascorbic acid to non-stabilized fish oil does not improve the induction time and thus the stability of the fish oil.

However, the combination of both 2.3% DGDG and 0.27% ascorbic acid as described above leads to a synergism and improvement of fish oil stability by a factor of ca. 20.

| Sample | Induction time at 100° C. |
| --- | --- |
| Non-stabilized fish oil | 0.8 h |
| Fish oil + 2.3% DGDG | 0.7 h |
| Fish oil + 0.27% ascorbic acid | 0.7 h |
| Fish oil + 2.3% DGDG + 0.27% ascorbic acid | 15.3 h |

Example 6

Antioxidant Efficiency of Galactolipid-rich Extract and Ascorbic Acid in Fish Oil Three oil preparations were prepared as follows:
Galactolipids from a galactolipid-rich oat extract (~10% total galactolipids, as determined by HPLC-ELSD) were dispersed into non-stabilized fish oil (Sofinol, DHA-rich fish oil, desodorized, type MFO-KO) at room temperature to obtain a final concentration in glactolipid of 0.5 wt % in oil.
Ascorbic acid (Fluka, Vitamin C Ph Eur, ref. 95212, 99.8% purity) was dispersed into the non-stabilized fish oil at room temperature to obtain a final concentration of 0.25 wt % ascorbic acid in oil.
A composition comprising two times more galactolipids than ascorbic acid was prepared according to example 3. This composition was added to the non stabilized fish oil so that the final concentration was 0.5 wt % in galactolipids and 0.25 wt % in ascorbic acid.

The Oxidative Stability Instrument (OSI, Omnion World) was used to evaluate the oxidative stability of the three oils containing galactolipids extract or ascorbic acid or a combination of both galactolipids extract and ascorbic acid. The stability was measured under accelerated conditions at 100° C. under oxygen flux as in example 5.

It is found, that the use of 0.5% of galactolipids from a galactolipid-rich oat extract on its own (~10% total galactolipids, as determined by HPLC-ELSD) improves only slightly the stability of fish oil (by a factor 2.6), and that the use of 0.25% of ascorbic acid on its own does not improve the stability of fish oil.

However the combination of both 0.5% galactolipids from a galactolipid-rich extract and 0.25% ascorbic acid (using 5 wt % of the (2:1)-galactolipid:ascorbic acid composition) leads to a synergism and improvement of fish oil stability by a factor up to 36.

| Sample | Induction time at 100° C. |
| --- | --- |
| Non-stabilized fish oil | 0.8 h |
| Fish oil + 0.5% galactolipids | 2.1 h |
| Fish oil + 0.25% ascorbic acid | 0.7 h |
| Fish oil + 0.5% galactolipids + 0.25% ascorbic acid | 28.0 h |

Example 7

Antioxidant Efficiency of Galactolipid-rich Extract and Ascorbyl Palmitate in Fish Oil Galactolipids from a galactolipid-rich oat extract (~10% total galactolipids, as determined by HPLC-ELSD) were dispersed into non-stabilized fish oil (Sofinol, DHA-rich fish oil, desodorized, type MFO-KO) at room temperature to obtain a final concentration in glactolipid of 0.5 wt % in oil.

A composition comprising two times more galactolipids than ascorbyl palmitate was prepared according to example 4. This composition was added to the non stabilized fish oil so that the final concentration was 0.5 wt % in galactolipids and 0.25 wt % in ascorbyl palmitate.

The Oxidative Stability Instrument (OSI, Omnion World) was used to evaluate the oxidative stability of these two mixtures as explained in example 5.

It is found that the use of 0.5% of galactolipids from a galactolipid-rich oat extract on its own improves only slightly the stability of fish oil (by a factor 2.6) whereas the combination of both 0.5% galactolipids from a galactolipid-rich extract and 0.25% ascorbyl palmitate (using 5 wt % of the (2:1)-galactolipid:ascorbyl palmitate composition prepared by the method of example 4) leads to a synergism and improvement of fish oil stability by a factor up to 36.

| Sample | Induction time at 100° C. |
| --- | --- |
| Non-stabilized fish oil | 0.8 h |
| Fish oil + 0.5% galactolipids | 2.1 h |
| Fish oil + 0.5% galactolipids + 0.25% ascorbyl palmitate | 28.2 h |

Example 8

Antioxidant Efficiency of Galactolipid-rich Extract and Ascorbic Acid in Fish Oil A composition comprising two times more galactolipids than ascorbic acid was prepared according to example 3. This composition was added to the non stabilized fish oil so that the final concentration was 0.065 wt % in galactolipids and 0.032 wt % in ascorbic acid.

The Oxidative Stability Instrument (OSI, Omnion World) was used to evaluate the oxidative stability of this mixture as explained in example 5.Using the Oxidative Stability Instrument (OSI, Omnion World), it is shown that the combination of both 0.065% galactolipids from a galactolipid-rich extract and 0.032% ascorbic acid leads to an improvement of fish oil stability by a factor 20.

| Sample | Induction time at 100° C. |
| --- | --- |
| Non-stabilized fish oil | 0.8 h |
| Fish oil + 0.065% galactolipids + 0.032% ascorbic acid | 15.5 h |

Example 9

Antioxidant Efficiency of Galactolipid-rich Extract and Ascorbyl Palmitate in Fish Oil A composition comprising two times more galactolipids than ascorbyl palmitate was prepared according to example 4.

This composition was added to the non stabilized fish oil so that the final concentration was 0.065 wt % in galactolipids and 0.032 wt % in ascorbyl palmitate.

The Oxidative Stability Instrument (OSI, Omnion World) was used to evaluate the oxidative stability of this mixture as explained in example 5.

It is observed that the combination of both 0.065% galactolipids from a galactolipid-rich extract and 0.032% ascorbyl palmitate (using 0.65 wt % of the (2:1)-galactolipid:ascorbyl palmitate composition prepared by the method of example 4) leads to an improvement of fish oil stability by a factor 19.

| Sample | Induction time at 100° C. |
| --- | --- |
| Non-stabilized fish oil | 0.8 h |
| Fish oil + 0.065% galactolipids + 0.032% ascorbyl palmitate | 15.1 h |

Example 10

Milk Product Comprising Galactolipids 50 g of skimmed milk powder was dispersed into 137.5 g of water. 140 mg of the composition of example 4 (Fish oil+ 0.5% galactolipids+0.25% ascorbyl palmitate) was mixed with 15 g of milk fat which was preheated at 40° C.

The lipid mixture obtained was slowly added to the Skimmed milk dispersed into water while a Polytron PT10-35 (Kinematica, Switzerland) was used to obtain a coarse emulsion. Homogenisation was obtained using 1 passage through a Niro Soavi Panda 2K at 500 bars. The obtained emulsion was heat treated at 75° C. for half an hour. It was then freeze dried to obtain a milk product enriched in DHA and EPA.

The obtained milk product contains:

23% lipids, 0.2% fish oil, 0.001% (10 ppm) Galactolipids, 0.0005% (5 ppm) ascorbyl palmitate.

Example 11

Antioxidant Efficiency of Galactolipid-rich Extract and Vitamin C Extract in Fish Oil Example 6 was repeated, but instead of using ascorbic acid of 99.8% purity from Fluka, a natural source of vitamin C (Natural Vitamin C, Acerola Concentrate Clear, with 17.2% vitamin C, Nichirei, Japan) was used. The results are shown below and confirm the synergistic effect between the galactolipids and the vitamin C.

| Sample | Induction time at 100° C. |
| --- | --- |
| Non-stabilized fish oil | 0.8 h |
| Fish oil + 0.5% galactolipids | 2.1 h |
| Fish oil + 0.25% Natural Vitamin C | 1.3 h |
| Fish oil + 0.5% galactolipids + 0.25% Natural Vitamin C | 10.3 h |

Example 12

Antioxidant Efficiency of Galactolipid-rich Extract and Ascorbic Acid in Fish Oil Example 5 was repeated, but instead of using DGDG isolated from spinach leaves, DGDG isolated from a wheat plant source was used. The results are shown below and confirm the synergistic effect between the galactolipids and the ascorbic acid.

| Sample | Induction time at 100 °C. |
| --- | --- |
| Non-stabilized fish oil | 0.8 h |
| Fish oil + 2.3% wheat DGDG | 3.2 h |
| Fish oil + 0.27% ascorbic acid | 0.7 h |
| Fish oil + 2.3% wheat DGDG + 0.27% ascorbic acid | 33.1 h |

Example 13

Antioxidant Efficiency of Galactolipid-rich Extract and Ascorbic Acid in Fish Oil Example 6 was repeated, but instead of using a (2:1)-galactolipid:ascorbic acid composition, a (17:1)-galactolipid:ascorbic acid composition was used. It was found that the use of a combination of both 0.5% galactolipids from a galactolipid-rich extract and 0.03% ascorbic acid (using 5 wt % of the (17:1)-galactolipid:ascorbic acid composition prepared using the method described in example 3) leads to a synergism and an improvement of fish oil stability by a factor 7.7; the use of 1% galactolipids and 0.06% ascorbic acid leads to an improvement of fish oil stability by a factor 13.2; and the use of 0.06% galactolipids and 36 ppm ascorbic acid leads to an improvement of fish oil stability by a factor 2.2.

| Sample | Induction time at 100° C. |
| --- | --- |
| Non-stabilized fish oil | 0.5 h |
| Fish oil + 0.060% galactolipids + 36 ppm ascorbic acid | 1.1 h |
| Fish oil + 0.5% galactolipids + 0.03% ascorbic acid | 3.9 h |
| Fish oil + 1.0% galactolipids + 0.06% ascorbic acid | 6.6 h |

Example 14

Antioxidant Efficiency of Galactolipid-rich Extract and Ascorbic Acid in Fish Oil Example 6 was repeated, but instead of using a (2:1)-galactolipid:ascorbic acid composition, a (40:1)-galactolipid:ascorbic acid composition was used. It was found that the use of a combination of both 0.5% galactolipids from a galactolipid-rich extract and 0.03% ascorbic acid (using 5 wt % of the (40:1)-galactolipid:ascorbic acid composition prepared using the method described in example 3) leads to a synergism and an improvement of fish oil stability by a factor up to 5.4; the use of 1% galactolipids and 0.06% ascorbic acid leads to an improvement of fish oil stability by a factor 8.8; and the use of 0.06 wt % galactolipids and 15 ppm ascorbic acid leads to an improvement of fish oil stability by a factor 2.2.

| Sample | Induction time at 100° C. |
| --- | --- |
| Non-stabilized fish oil | 0.5 h |
| Fish oil + 0.060% galactolipids + 15 ppm ascorbic acid | 1.1 h |
| Fish oil + 0.5% galactolipids + 0.012% ascorbic acid | 2.7 h |

-continued

| Sample | Induction time at 100° C. |
| --- | --- |
| Fish oil + 1.0% galactolipids + 0.025% ascorbic acid | 4.4 h |

The invention claimed:

1. A method for protecting a composition against oxidation, the method comprising:
adding a galactolipid, and ascorbic acid and/or a derivative thereof, to the composition, the composition comprising at least 80 wt % of lipids.

2. The method of claim 1, wherein the concentration of the galactolipid in the composition is at least 0.005 wt % or greater of the composition.

3. The method of claim 1, wherein the derivative of the ascorbic acid is ascorbyl palmitate.

4. The method of claim 1, wherein the weight ratio of the galactolipid versus the ascorbic acid or its derivative in the composition is from 100:1 to 1:1.

5. The method of claim 1, wherein the galactolipid is from a plant origin.

6. The method of claim 1, comprising at least one lipid, the lipid comprising a fatty acid selected from the group consisting of oleic acid, myristoleic acid, palmitoleic acid, sapienic acid, erucic acid, alpha-linolenic acid (ALA), linoleic acid (LA), dihomo-gamma-linolenic acid (DGLA), conjugated linoleic acid (CLA), arachidonic acid (ARA), eicosapentaenoic acid (EPA), docosapentaenoic acid (DPA), docosahexaenoic acid (DHA), and combinations thereof.

7. The method of claim 1, wherein the composition comprises the galactolipid in a concentration from 0.001 to 10 wt % of the composition, wherein the weight ratio of the galactolipid versus the ascorbic acid or its derivative in the composition is from 50:1 to 1:1, and wherein the composition comprises at least 80 wt % of lipids.

8. A method for manufacturing a food product composition comprising a galactolipid, ascorbic acid and/or a derivative thereof, and at least one further lipid, the method comprising the steps of:
mixing ascorbic acid and/or a derivative thereof with a galactolipid; and
adding the mixture to a composition comprising at least 80 wt % of lipids.

9. The method of claim 8, wherein mixing the ascorbic acid and/or the derivative thereof with the galactolipid is in the presence of a solvent.

10. The method of claim 9, wherein the solvent is selected from the group consisting of water, ethanol, and a combination thereof.

11. The method of claim 8, wherein the galactolipid is used in the form of a plant extract.

12. The method of claim 11, wherein the plant extract comprises the galactolipid in a concentration of 5 wt % or more of the extract.

13. The method of claim 8, wherein the composition comprises the galactolipid in a concentration from 0.001 to 10 wt % of the composition, wherein the weight ratio of the galactolipid versus the ascorbic acid or its derivative in the composition is from 50:1 to 1:1, and wherein the composition comprises at least 80 wt % of lipids.

14. Composition obtainable by the method according to claim 8.

15. Food product comprising the composition of claim 14, wherein the food product is a human and/or an animal food product.

16. A composition for use in food, the composition comprising
a galactolipid in a concentration from 0.005 to 10 wt % of the composition;
ascorbic acid and/or a derivative thereof, the weight ratio of the galactolipid versus the ascorbic acid or its derivative in the composition being from 50:1 to 1:1; and
at least 80 wt % lipids.

* * * * *